United States Patent [19]
Schmitt

[11] Patent Number: 5,910,906
[45] Date of Patent: Jun. 8, 1999

[54] DIGITAL SINGLE-FREQUENCY TONE DETECTION IN PRESENCE OF ALIASES

[75] Inventor: Ronald Frederick Schmitt, Raleigh, N.C.

[73] Assignee: Northern Telecom Limited, Montreal, Canada

[21] Appl. No.: 08/686,353

[22] Filed: Jul. 25, 1996

[51] Int. Cl.[6] .................................................. G06F 7/38
[52] U.S. Cl. ...................................... 364/724.09; 379/372
[58] Field of Search ........................... 364/724.08, 724.09, 364/484; 370/526; 375/340; 379/372, 386

[56] References Cited

U.S. PATENT DOCUMENTS

| | | | |
|---|---|---|---|
| 4,286,326 | 8/1981 | Houdard | 364/485 |
| 4,354,248 | 10/1982 | Conger et al. | 364/724.09 |
| 4,363,100 | 12/1982 | Agnew et al. | 364/484 |
| 4,439,639 | 3/1984 | Munter | 179/84 VF |
| 4,599,495 | 7/1986 | Richards | 179/84 VF |
| 4,709,344 | 11/1987 | Crawford | 364/724.09 |
| 4,737,984 | 4/1988 | Brown | 379/372 |
| 5,138,569 | 8/1992 | Valenzuela | 364/724.09 |
| 5,392,347 | 2/1995 | Ito et al. | 379/372 |
| 5,477,465 | 12/1995 | Zheng | 364/485 |

Primary Examiner—Ayaz R. Sheikh
Assistant Examiner—Douglas S. Lee
Attorney, Agent, or Firm—Foley & Lardner

[57] ABSTRACT

The invention is a method for performing tone detection on a digital signal processor (DSP) that may be used in the presence of tone aliases caused by inadequate anti-aliasing filtering. The method involves processing an input signal at different sampling rates, and can be used with any tone detection algorithm. A tone is detected when it is present at each of the sampling rates. The method allows tone detection to be performed without the use of a proper anti-aliasing filter.

14 Claims, 7 Drawing Sheets

DIGITAL SINGLE-FREQUENCY TONE DETECTION IN PRESENCE OF ALIASES

FIELD OF THE INVENTION

The invention generally relates to tone detectors and, in particular, to a method for tone detection effected on a digital signal processor (DSP) based apparatus, in the presence of aliases caused by inadequate anti-alias filtering.

BACKGROUND OF THE INVENTION

One of the general rules of digital signal processing is that sampling of a typical analog signal should be performed above the Nyquist rate. The Nyquist rate is defined as twice the highest frequency (referred to as the Nyquist frequency) of the signal to be sampled. An equivalent statement is that for a given sampling rate, all signal content at and above half this sample rate should be removed before being sampled. If this rule is followed, then the analog signal can be uniquely determined or reconstructed from the samples taken. This relationship is known as the Nyquist sampling theorem. If this rule is not followed, a phenomenon known as aliasing occurs, in which tones at frequencies above half the sample rate appear at other frequencies in the spectrum of the sampled signal.

Aliasing is the direct result of the process of sampling an analog signal to produce a digital signal. Sampling theory shows that the spectrum of the resulting digital signal will be the sum of periodically repeated copies of the spectrum of the analog signal. Specifically, the analog spectrum is shifted by $nF_s$, where n is an integer and $F_s$ is the sampling frequency, to produce an infinite number of shifted copies which are then summed together to produce the spectrum of the digitized signal. If the Nyquist theorem is obeyed, the spectrum of the digitized signal will be identical in the range from zero to $F_s/2$ Hz to that of the analog signal. If the Nyquist theorem is not obeyed, the spectrum value at each frequency $F_o$, in the range from zero to $F_s/2$ Hz, will be equal to the sum of the spectrum value at each frequency $nF_s-F_o$ and $nF_s+F_o$ in the analog signal.

Figure 1:
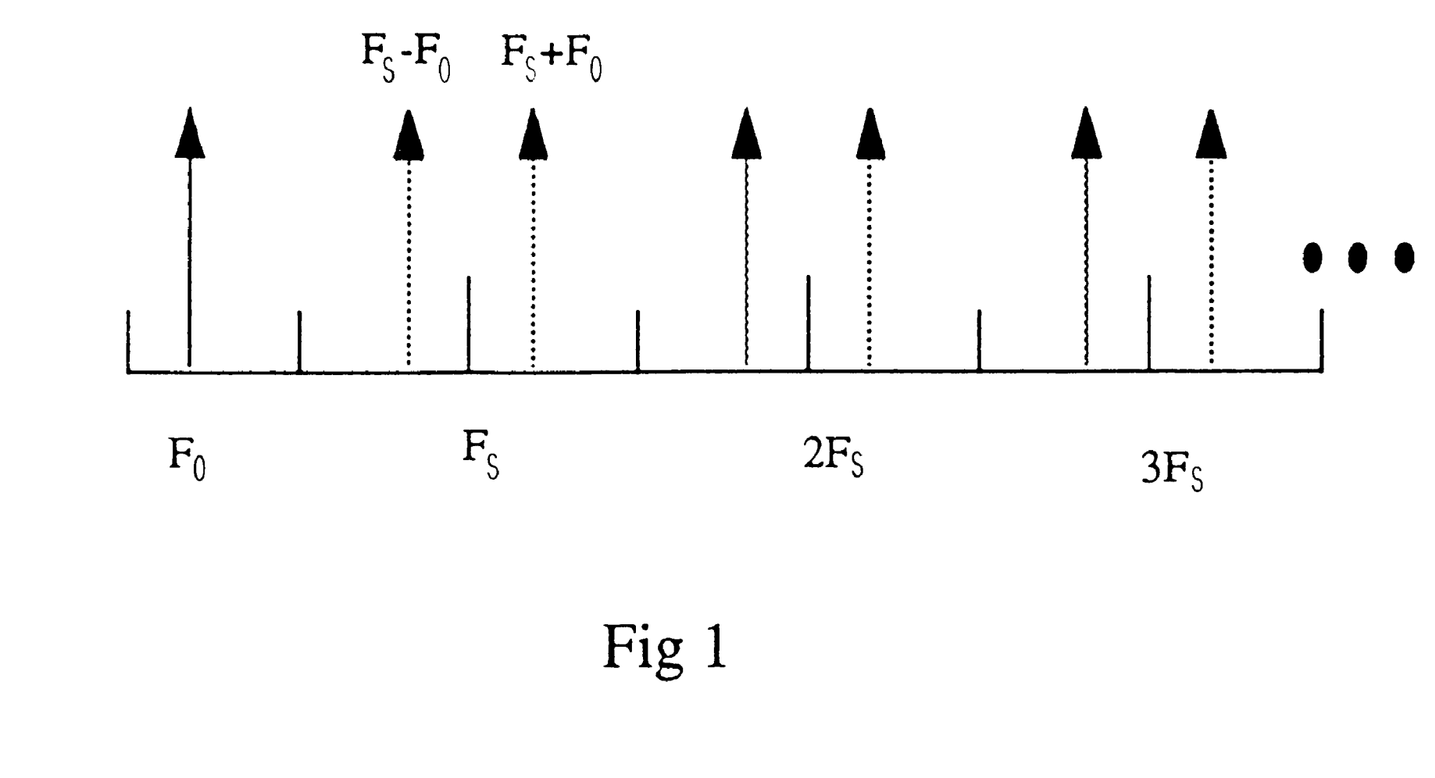
FIG. 1 illustrates a tone present at frequency $F_o$ and its aliases for a sampling rate $F_s$.

A tone detector may be designed to decide whether or not a tone at frequency $F_o$ is present. Aliasing may cause the detector to spuriously declare the presence of the $F_o$ tone both for a valid tone at $F_o$ and for any tones at $nF_s-F_o$ or $nF_s+F_o$. FIG. 1 illustrates a frequency spectrum of a sampled signal which consists of an actual tone at frequency Fo, and its aliases at $F_s-F_o$ and $F_s+F_o$, $2F_s-F_o$ and $2F_s+F_o$, etc.

A known method used to prevent aliasing is to place an analog low-pass filter (LPF), having a cutoff frequency less than $F_s/2$, in front of a digitizer. Referred to as anti-aliasing filtering, this practice insures that the Nyquist theorem is obeyed, preventing aliasing problems. However, the necessity for this anti-aliasing filter with such a cutoff frequency may add considerable cost to a product, and it may occupy precious real estate on a printed circuit board (PCB). In other cases, where hardware is being reused for another application, the anti-aliasing filters may need to be changed or new filters may need to be added.

SUMMARY OF THE INVENTION

It is an object of the present invention to provide a new and improved method for tone detection.

The invention, therefore, according to a broad aspect provides a method for indicating presence of a tone in an input signal, comprising the steps of: performing, on the input signal, tone detection at multiple sampling rates; and indicating a tone is present when the performed tone detection detects the tone, in coincidence, at each of the multiple sampling rates.

According to a second broad aspect, the invention provides a method for indicating presence of a tone in an input signal, comprising the steps of: performing, on the input signal, a tone detection process which executes at a first sampling rate and which generates a first signal indicative of the presence or absence of a detection; performing, on the input signal, another tone detection process which executes at a second sampling rate, different from the first sampling rate, and which generates a second signal indicative of the presence or absence of a detection; generating an output signal which indicates the tone is present when the first and second signals both indicate, in coincidence, the presence of detections.

According to a third broad aspect, the invention provides an apparatus for indicating presence of a tone in an input signal, comprising: means for performing, on the input signal, tone detection at multiple sampling rates; and means for indicating the tone is present when the performed tone detection detects the tone, in coincidence, at each of the multiple sampling rates.

According to a fourth broad aspect, the invention provides an apparatus for indicating presence of a tone in an input signal, comprising: means for performing, on the input signal, a tone detection process which executes at a first sampling rate and which generates a first signal indicative of the presence or absence of a detection; means for performing, on the input signal, another tone detection process which executes at a second sampling rate, different from the first sampling rate, and which generates a second signal indicative of the presence or absence of a detection; means for generating an output signal which indicates the tone is present when the first and second signals both indicate, in coincidence, the presence of detections.

According to a fifth broad aspect, the invention provides a method for reducing complexity, including number of poles, of an anti-aliasing filter used in sampling an input signal for detecting a tone that may be present therein, comprising the steps of: filtering the input signal, through the anti-aliasing filter, such that attenuation of the input signal beyond a particular frequency is below a detection threshold; sampling, at a first rate, the filtered input signal thereby generating a first sampled signal; sampling, at a second rate which is different from the first rate, the filtered input signal thereby generating a second sampled signal; detecting the tone when it is present in both the first and the second sampled signals; and wherein the particular frequency corresponds to initial overlap between first alias frequencies and second alias frequencies that would result from sampling the input signal at the first and second rates, respectively, whereby the anti-aliasing filter may have a cut-off frequency below the particular frequency but does not need to attenuate the input signal below the threshold until the particular frequency.

A method for tone detection, embodying the invention, is to effect a tone detection process at multiple sampling rates and declare that a tone is present only when the process coincidently detects the tone while running at each of the sample rates. The tone detection process may be implemented by any algorithm that meets the requirements of a particular application. The simplest case is to use two sampling rates, $F_{s1}$ and $F_{s2}$, to detect a tone at frequency $F_o$. For instance, an input signal is digitized and then processed by a DSP executed tone detection process that alternates between the two sampling rates. The detection process running at sampling rate $F_{s1}$ will detect tones at $F_o$, $nF_{s1}-F_o$ and $nF_{s1}+F_o$. The detection process running at sampling rate $F_{s2}$ will detect tones at $F_o$, $nF_{s2}-F_o$ and $nF_{s2}+F_o$. The result is that each sample rate produces a different set of alias frequencies. If these sets of aliases are mutually exclusive (i.e., alias frequencies in both sets are unique with no duplication), the output of the two rate samplings from the detection process will only both be true for tones at frequency $F_o$.

The method of this invention may be advantageously used in tone detection apparatus to eliminate the need or at least reduce the cost of a large anti-aliasing filter from the hardware design, which filter prior to this invention must comply with the Nyquist sampling theorem. In other situations, hardware may be re-used for other applications by utilizing new DSP software to effect this method. The new DSP software may require sampling rates different from what the hardware anti-aliasing filters were designed for. In certain cases, this invention may allow such hardware to be re-used without any physical modification. The method can be adapted for use with any algorithm characterizing a tone detection process.

BRIEF DESCRIPTION OF THE DRAWINGS

The invention will be better understood from the following detailed description of a tone detector together with reference to the accompanying drawings, in which.

DETAILED DESCRIPTION

Figure 2:
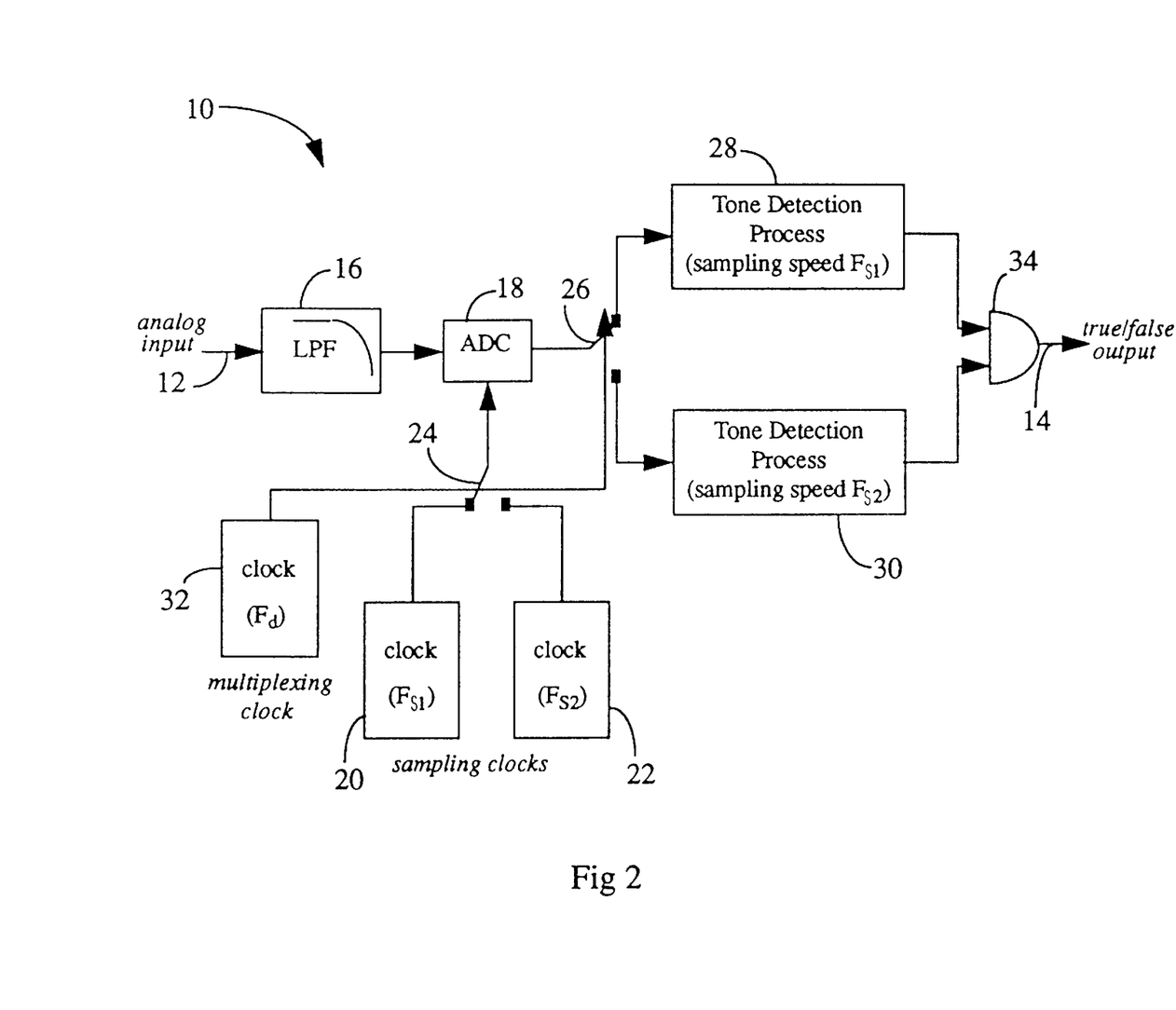
FIG. 2 is a schematic depicting functional blocks of an embodiment of the tone detector.

Referring to FIG. 2, illustrated is an embodiment of a tone detector 10, in accordance with the present invention, which is to detect a tone at frequency Fo when present in analog input signal 12 and accordingly generate an output signal 14 indicative of such. The tone detector 10 comprises, in terms of functional blocks, a low pass filter (LPF) 16 which receives the input signal 12 and which is connected to an analog-to-digital converter (ADC) 18. The ADC 18 samples the filtered input signal at two different predetermined rates $F_{s1}$ and $F_{s2}$, under the control of respective sampling clocks 20 and 22 signals from which are provided thereto in time division through multiplexing 24, and generates a corresponding digital data sample stream having the $F_{s1}$ samples and the $F_{s2}$ samples which, respectively, are provided in time division through multiplexing 26 to first and second tone detection processes 28 and 30. A multiplexing clock 32 with a time division window size of $T_d=1/F_d$ may control in synchronization the multiplexing 24 and 26. The first tone detection process 28, which may be an appropriate algorithm executing at the sampling rate $F_{s1}$, will detect tones at $F_o$, $nF_{s1}-F_o$, $nF_{s1}+F_o$. The second tone detection process 30, which may be the same algorithm executing at the sampling rate $F_{s2}$, will detect tones at $F_o$, $nF_{s2}-F_o$, $nF_{s2}+F_o$. Output from each of the two tone detection processes 28 and 30 are logically ANDed at gate 34 to generate the output signal 14 as a binary value which is true when a tone at $F_o$ is detected and otherwise is false.

The low-pass filter 16, dependent upon the particular application, may still be used in the tone detector 10 but it does not need to satisfy the Nyquist criteria. The following describes such an application with the requirements for the low-pass filter 16.

Figure 3A:
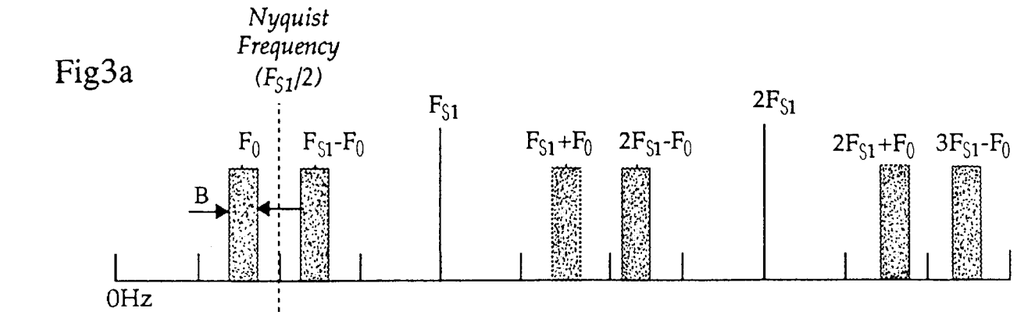
FIGS. 3a, 3b and 3c illustrate example frequency responses of the tone detector.
Figure 3B:
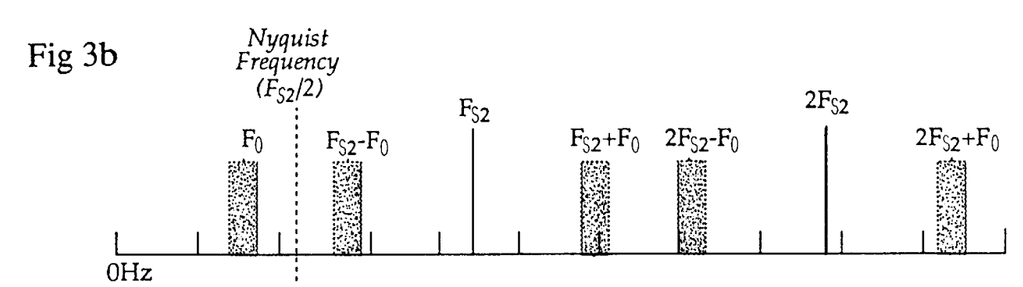
Figure 3C:
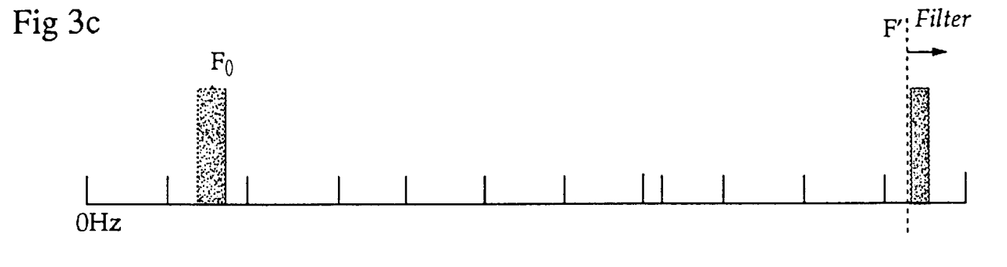

FIG. 3 in general represents an example response of the tone detector 10 running at the two sampling rates $F_{s1}$ and $F_{s2}$. The tone detector 10 is designed to detect frequencies at $F_o+/-B/2$, where B is the tone detector bandwidth. FIG. 3a specifically illustrates regions of tone detection for the first tone detection process 28 at sample rate $F_{s1}$. Each region is B Hz wide, centered at the frequency indicated above it. FIG. 3b specifically illustrates regions of tone detection for the second tone detection process 30 at sample rate $F_{s2}$. FIG. 3c shows regions of intersection between the two tone detection processes 28 and 30. This last figure suggests that the detector 10, in accordance with this invention, detects tones at the desired frequency region and rejects tones at alias frequencies up to F', which is the initial region of overlap. Since the alias regions continue on infinitely, in most applications there will be some region of alias overlap. The location of F' is a function of the tone detection frequency $F_o$, tone detection bandwidth $_B$, and the two sampling rates $F_{s1}$ and $F_{s2}$. Tones at and above F' should be attenuated below the threshold of the detector 10 if the input signal 12 contains tones at such frequencies. Thus the requirements of the low-pass filter 16 are much less stringent than the Nyquist sampling theorem, which requires that tones at and above half the sampling rate be attenuated below the detector threshold. In addition, because F' is greater than Fs/2, the required rate of attenuation for the low-pass filter 16 will be less using this invention. For example, the tone detector may use an anti-aliasing filter 16 having a cut-off frequency below the Nyquist frequency, but with an attenuation that is not steep enough to sufficiently filter aliases below the given threshold of the detector. Consequently, a filter of smaller order (i.e. fewer poles) may be used, resulting in less complexity and comprising less board real-estate. If it is known that the signal will not contain tones at or above F', then the low-pass filter 16 is not needed.

Moreover, the filter 16 is not necessary when there is negligible signal power, in comparison to the detection power threshold of the detector, above the first region of alias overlap F' in FIG. 3c. A first region of overlap F' will occur for the lowest pair of integers, n and m, that satisfy the following equation:

$$|(nF_{s1}+/-F_o)-(mF_{s2}+/-F_o)|<B$$

where B is the bandwidth of the tone detector.

For a particular implementation, the detector 10 is to be applied to detect 16 kHz ($F_o$) tones produced by a payphone. The specifications to which this tone detector 10 is designed are listed below.

| | |
|---|---|
| Detect Range: | 15.9 kHz < F$_o$ < 16.1 kHz, −41 dBm to +4 dBm |
| Reject Ranges: | F$_o$ < 14 kHz and F$_o$ > 18 kHz, −12 dBm and below 15.9 kHz < F$_o$ < 16.1 kHz, −45.5 dBm and below (0 dBm is defined by 1 mw through a 600 ohm load) |
| Tone duration; | 300–500 milliseconds or 600–900 milliseconds |

Figure 4:
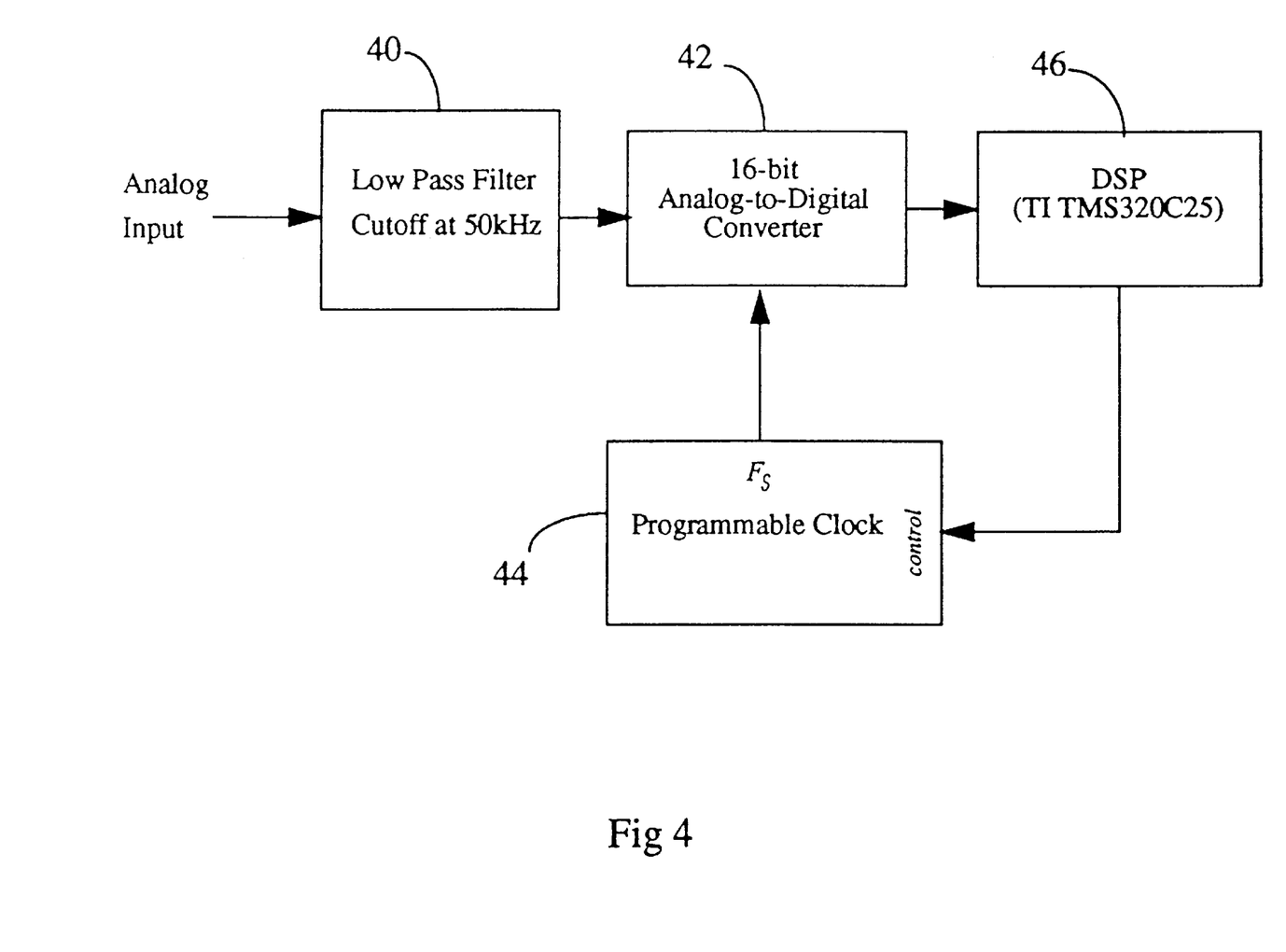
FIG. 4 is a schematic of a hardware configuration on which the detector functionality may be implemented.

A testhead hardware arrangement on which the tone detector 10 may be implemented for the payphone application is shown in FIG. 4. The testhead hardware comprises a low-pass filter 40 having a cutoff at frequency 50 kHz, a 16 bit analog-to digital converter (ADC) 42, a programmable clock 44, and a digital signal processor (DSP) 46 which, for example, may be a Texas Instrument TMS320C25. The DSP 46 is provisioned with software to provide the functionality described in relation to FIG. 2 and, in particular the first and second tone detection processes 28 and 30.

An equation consisting of a single-frequency DFT (Discrete Fourier Transform), weighted with low-pass filter coefficients, may be programmed as an algorithm in the DSP software, execution of which by the DSP 46 at two different rates effect the detection processes 28 and 30 of the detector 10. One such tone detection equation is $$y[n] = \left| \sum_{k=0}^{N-1} x[n-k] \cdot h[k] \cdot \{\cos[2\pi(F_0/F_S)k] + j \cdot \sin[2\pi(F_0/F_S)k]\} \right|^2$$

wherein x[n] represents the sampled (digitized) input signal;

h[k] represents coefficients of the digital low-pass filter that is used to shape the tone detection range thereby determining the bandwidth B of the tone detection;

$F_o$ represents the center frequency of the tone detection;

$F_s$ represents the rate at which x[n] is sampled from the analog input signal; and y[n] represents an estimate of the mean-square power of the input signal x[n] within the tone detection region B centered around frequency $F_o$ ($F_o$+/−B/2).

Figure 5A:
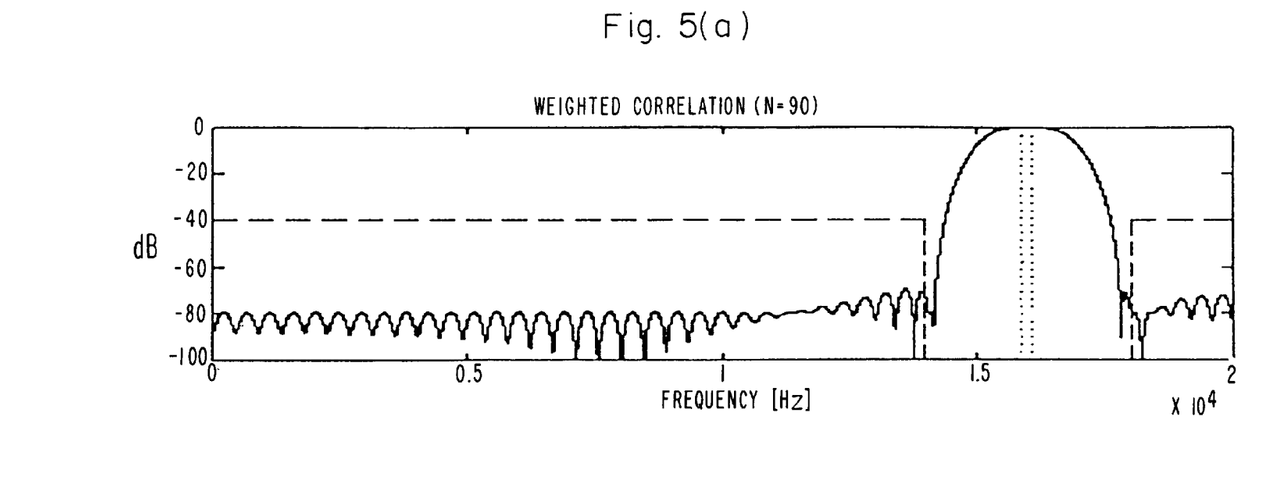
FIG. 5 illustrates a frequency response of a tone detection algorithm, over the full range and magnified.
Figure 5B:
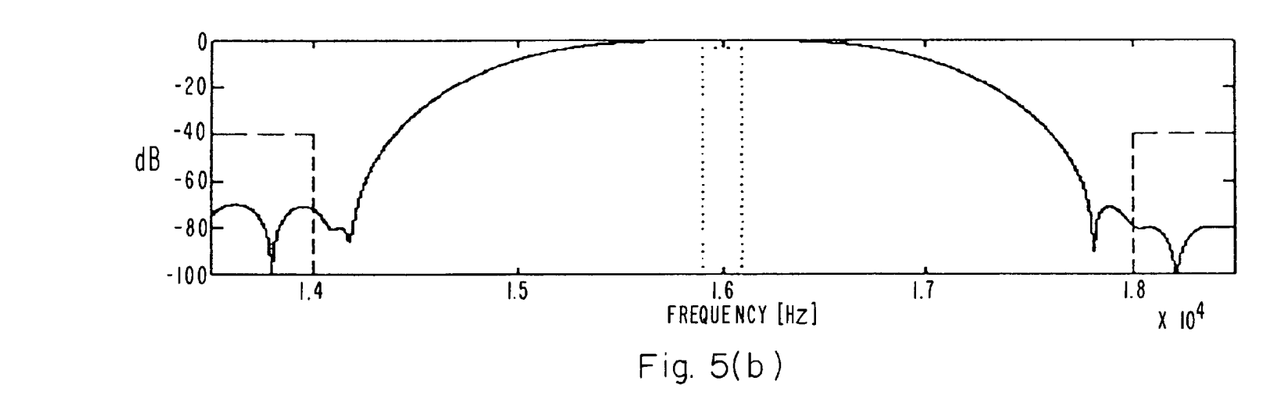

The filter constitiuted by coefficients h[k] has no gain, so the sum h[0] . . . h[N−1] is "1". If all h[k]'s are set to the value 1/N, such results in what is termed the single frequency DFT or a "single frequency Periodogram". The cutoff frequency of the low-pass filter coefficients h[n] sets the tone detection bandwidth (i.e., the detection bandwidth will be twice the cutoff frequency of the low-pass filter coefficients). FIG. 5 shows the theoretical frequency response of the tone detection algorithm y[n] that is used. This figure shows that the tone detection bandwidth B is about 3600 Hz (16 kHz+/−1.8 kHz).

In the DSP software to implement the tone detection processes 28 and 30, the mean-square power estimate y[n] is compared to a predetermined tone detection power threshold. If the estimate y[n] is greater than the detection threshold (−43.25 dBm), each detection process will declare that a tone is present by outputting a "TRUE". Otherwise, when y[n] is less than the threshold, each tone detection process outputs a "FALSE".

The DSP software, for effecting the 16 kHz detector, is designed around the limitations of the FIG. 4 hardware. This hardware includes a sampling clock 44 whose frequency is programmable via software with a maximum rate of 47.6 ksamples/sec. The filter 40 used is the only low-pass filter available in the hardware which will pass 16 kHz tones. This filter is a 4-pole, 50 kHz cutoff low-pass filter. Using the 50 kHz low-pass filter 40 and complying with the Nyquist sampling theorem would require that one sample at greater than 100 ksamples/sec, which is not possible with the given hardware. Using a lower sampling rate will cause aliasing because the 50 kHz low-pass filter will not properly attenuate the first few aliases of 16 kHz.

Figure 6:
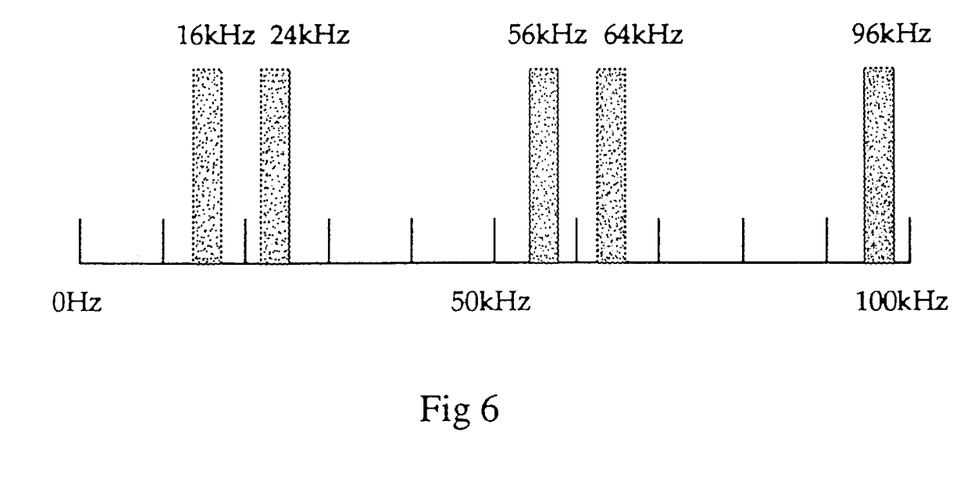
FIG. 6 illustrates regions of tone detection for the algorithm running at 40 Ksamples/sec.
Figure 7:
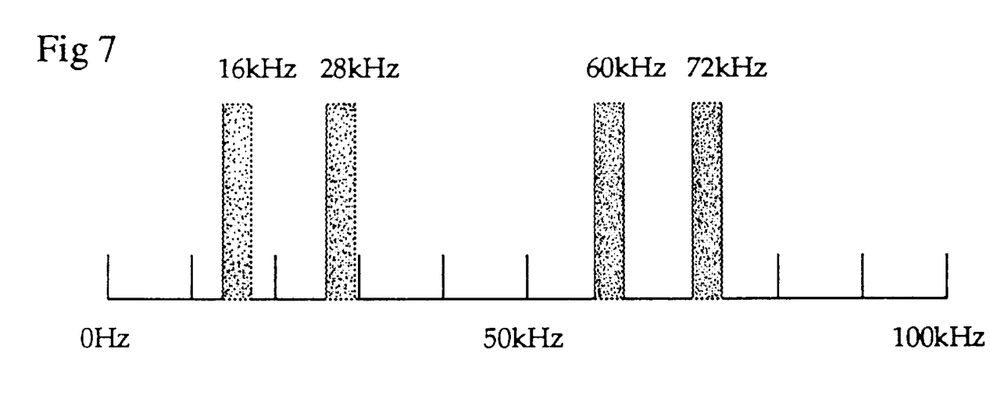
FIG. 7 illustrates regions of tone detection for the algorithm running at 44K samples/sec.
Figure 8:
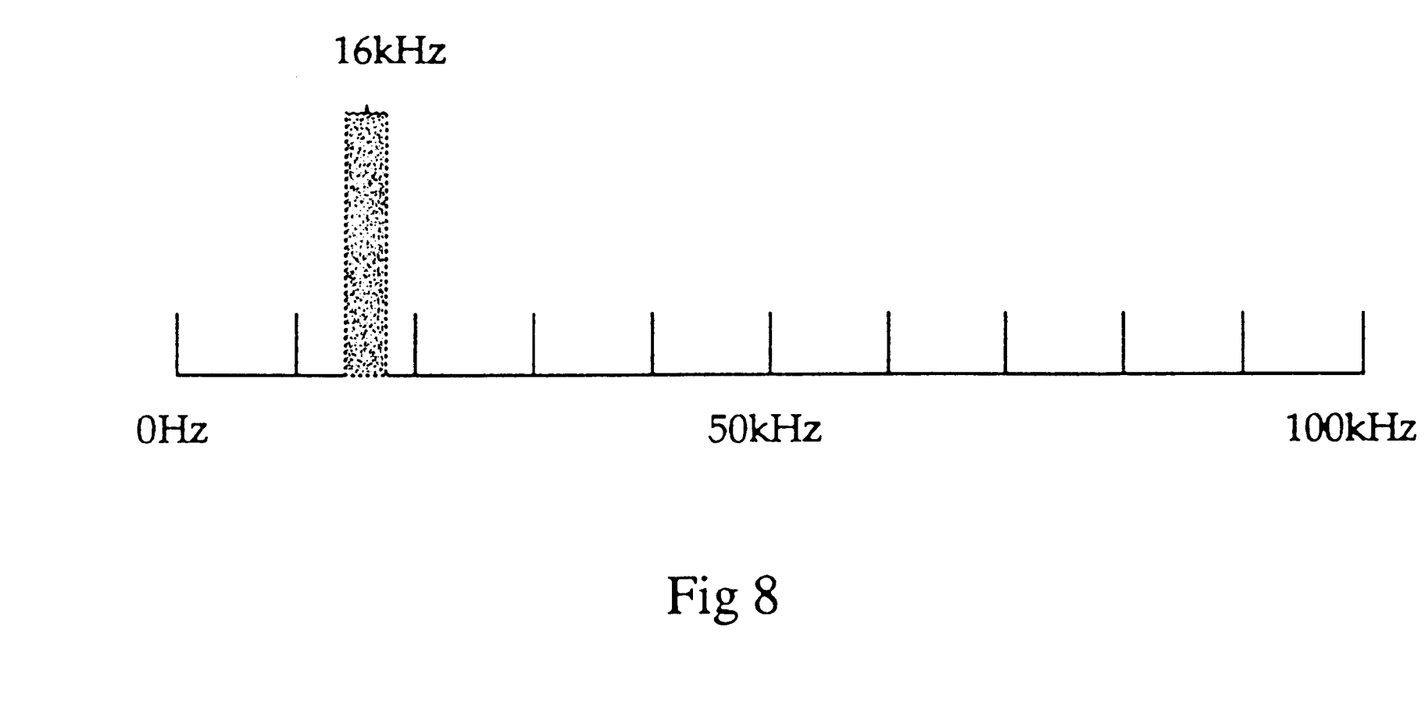
FIG. 8 illustrates regions of tone detection from a logical combination of FIGS. 6 and 7, in accordance with the invention.

This problem is solved, with the invention, by performing the tone algorithm at two different sampling rates, 40 kHz and 44 kHz, each satisfying the Nyquist sampling rate. This produces two sets of aliases as shown in FIG. 6 and FIG. 7, respectively, which depict regions of tone detection 3.6 kHz in width and centered at the frequency listed above it. As can be seen from FIG. 8, the region at 16 kHz is the only region that will be detected at both sampling rates. Aliases above 100 kHz are shown not for two reasons. First, it is extremely unlikely that such a high frequency tone, with the appropriate levels and duration, be present on a coin phone telephone line. Second, the combination of the 50 kHz low-pass filter attenuation and the high-frequency attenuation produced by a typical twisted pair phone line will attenuate signals above 100 kHz to below the detector threshold. It is noted that the first region of overlap (F') for the payphone application of the invention is the 4 kHz wide region centered about 104 kHz. This corresponds to 3*$F_{s1}$−$F_o$ and 2*$F_{s2}$+$F_o$. The 50 Khz filter drops off at about 24 dB per octave, giving about 25 dB of attenuation at this frequency, and typical telephone lines will give about 10 dB loss per mile. So the combined effect should sufficiently attenuate any signals at and above F'.

The sampling frequency of the ADC 42 is controlled by the DSP 46 via a memory mapped register in the programmable clock 44, to generate either a 40 kHz or 44 kHz square wave used for clocking the analog-to-digital converter 42. The multiplexing between the two sample rates is accomplished in the following manner. The ADC 42 captures 90 data samples at the 40 kHz sample rate and the DSP 46 (functioning as the first tone detection process 28 in FIG. 2) calculates a true or false tone detection result. This result will be true for tones at 16 kHz and all the aliases shown in FIG. 6. The ADC 42 also captures 88 data samples at the 44 kHz sample rate and the DSP 46 (functioning as the second tone detection process 30 in FIG. 2) again calculates a true or false tone detection result indicative of tones at 16 kHz and all the aliases shown in FIG. 8. Only when both of these results are true will the DSP 46 output a true (providing the functionality of the AND gate 34); consequently only 16 kHz tones will be detected.

One limitation is that the detector 10 is susceptible to multiple alias tones which can correspond to actual tones present in the analog input signal. For instance, if a tone was present at 24 kHz and another tone was simultaneously present at 28 kHz, the detector 10 will declare that a 16 kHz tone is present.

Those skilled in the art will recognize that various modifications and changes could be made to the invention without departing from the spirit and scope thereof. It should therefore be understood that the claims are not to be considered as being limited to the precise embodiments set forth above, in the absence of specific limitations directed to each embodiment.

I claim:

1. A method for indicating presence of a tone in an input signal, comprising the steps of:

performing tone detection at more than one sampling rate over more than one period of time of the same input signal;

filtering the input signal substantially at or below a frequency which corresponds to initial overlap between first alias frequencies that result from a first sampling rate and second alias frequencies that result from a second sampling rate, whereby any tones at or above the filtering frequency are attenuated below threshold of the performed tone detection; and indicating a tone is present when the performed tone detection detects the tone, in coincidence, at each of the sampling rates.

2. A method for indicating presence of a tone in an input signal, comprising the steps of:

performing, on the input signal, a tone detection process which executes at a first sampling rate over a first period of time and which generates a first signal indicative of the presence or absence of a detection;

performing, on the same input signal, another tone detection process which executes at a sampling rate over a second, subsequent period of time, different from the first sampling rate, and which generates a second signal indicative of the presence or absence of a detection;

filtering the input signal substantially at or below a frequency which corresponds to initial overlap between first alias frequencies that result from the first sampling rate and second alias frequencies that result from the second sampling rate, whereby any tones at or above the filtering frequency are attenuated below threshold of the tone detection processes; and generating an output signal which indicates the tone is present when the first and second signals both indicate, in coincidence, the presence of detections.

3. A method as claimed in claim 2, wherein the tone detection process and the another tone detection process include a tone detection algorithm executed on a digital signal processor at the first and second sampling rates, respectively.

4. A method as claimed in claim 3, wherein the tone detection algorithm is characterized by an equation $$y[n] = \left| \sum_{k=0}^{N-1} x[n-k] \cdot h[k] \cdot \{\cos[2\pi(F_0/F_S)k] + j \cdot \sin[2\pi(F_0/F_S)k]\} \right|^2$$

wherein x[n] represents the sampled input signal;

h[k] represents coefficients of the digital low-pass filter that is used to shape the tone detection range thereby determining bandwidth B of the tone detection;

$F_o$ represents frequency of the tone;

$F_s$ represents the rate at which x[n] is sampled from the input signal; and y[n] represents an estimate of mean-square power of the input signal x[n] within the tone detection region B centered around frequency $F_o$; and wherein the tone detection process and the another tone detection process generate the first and second signals, respectively, to indicate the presence of a detection when y[n] is approximately equal to or above a predetermined threshold value and otherwise to indicate the absence of a detection.

5. A method as claimed in claim 2, wherein the initial overlap occurs for the lowest pair of integers, m and n, that satisfy $$|(nF_{s1}+/-F_o)-(mF_{s2}+/-F_o)|<B$$

wherein $F_o$ represents center frequency of the tone detection;

$F_{s1}$ and $F_{s2}$ represent the first and second sampling rates, respectively; and B represents bandwidth of the tone detection.

6. A method as claimed in claim 5, wherein the filtering frequency is greater than half the first or second sampling rate.

7. An apparatus for indicating presence of a tone in an input signal, comprising:

means for performing tone detection at more than one sampling rate over more than one period of time of the same input signal;

means for filtering the input signal substantially at or below a frequency which corresponds to initial overlap between first alias frequencies that result from a first sampling rate and second alias frequencies that result from a second sampling rate, whereby any tones at or above the filtering frequency are attenuated below threshold of the performed tone detection; and means for indicating a tone is present when the performed tone detection detects the tone, in coincidence, at each of the sampling rates.

8. An apparatus for indicating presence of a tone in an input signal, comprising:

means for performing, on the input signal, a tone detection process which executes at a first sampling rate over a first period of time and which generates a first signal indicative of the presence or absence of a detection;

means for performing, on the same input signal, another tone detection process which executes at a second sampling rate over a second, subsequent period of time, different from the first sampling rate, and which generates a second signal indicative of the presence or absence of a detection; and means for filtering the input signal substantially at or below a frequency which corresponds to initial overlap between first alias frequencies that result from the first sampling rate and second alias frequencies that result from the second sampling rate, whereby any tones at or above the filtering frequency are attenuated below threshold of the tone detection processes; and means for generating an output signal which indicates the tone is present when the first and second signals both indicate, in coincidence, the presence of detections.

9. An apparatus as claimed in claim 8, wherein the means for performing the tone detection process and the means for performing the another tone detection process include a tone detection algorithm executed on a digital signal processor at the first and second sampling rates, respectively.

10. An apparatus as claimed in claim 9, wherein the tone detection algorithm is characterized by an equation $$y[n] = \left| \sum_{k=0}^{N-1} x[n-k] \cdot h[k] \cdot \{\cos[2\pi(F_0/F_S)k] + j \cdot \sin[2\pi(F_0/F_S)k]\} \right|^2$$

wherein x[n] represents the sampled input signal;

h[k] represents coefficients of the digital low-pass filter that is used to shape the tone detection range thereby determining bandwidth B of the tone detection;

$F_o$ represents frequency of the tone;

$F_s$ represents the rate at which x[n] is sampled from the input signal; and y[n] represents an estimate of mean-square power of the input signal x[n] within the tone detection region B centered around frequency $F_o$; and wherein the tone detection process and the another tone detection process generate the first and second signals, respectively, to indicate the presence of a detection when y[n] is approximately equal to or above a predetermined threshold value and otherwise to indicate the absence of a detection.

11. An apparatus as claimed in claim 8, wherein the initial overlap occurs for the lowest pair of integers, m and n, that satisfy $$|(nF_{s1}+/-F_o)-(mF_{s2}+/-F_o)|<B$$

wherein $F_o$ represents center frequency of the tone detection;

$F_{s1}$ and $F_{s2}$ represent the first and second sampling rates, respectively; and B represents bandwidth of the tone detection.

12. An apparatus as claimed in claim 11, wherein the filtering frequency is greater than half the first or second sampling rate.

13. A method for reducing complexity, including number of poles, of an anti-aliasing filter used in sampling an input signal for detecting a tone that may be present in the input signal, comprising the steps of:

filtering the input signal, through the anti-aliasing filter, such that attenuation of the input signal beyond a particular frequency is below a detection threshold;

sampling, at a first rate, the filtered input signal thereby generating a first sampled signal;

subsequently sampling, at a second rate which is different from the first rate, the same filtered input signal thereby generating a second sampled signal; and detecting the tone when it is present in both the first and the second sampled signals;

wherein the particular frequency corresponds to initial overlap between first alias frequencies and second alias frequencies that would result from sampling the input signal at the first and second rates, respectively, whereby the anti-aliasing filter may have a cut-off frequency below the particular frequency but does not need to attenuate the input signal below the threshold until the particular frequency.

14. A method as claimed in claim 13, wherein the initial overlap occurs for the lowest pair of integers, m and n, that satisfy $$|(nF_{s1}+/-F_o)-(mF_{s2}+/-F_o)|<B$$

wherein $F_o$ represents center frequency of the tone detection;

$F_{s1}$ and $F_{s2}$ represent the first and second sampling rates, respectively; and B represents bandwidth of the tone detection.

* * * * *